July 8, 1947.  D. A. DALLY  2,423,640
DECORATIVE KNIFE HANDLE
Filed Nov. 3, 1944
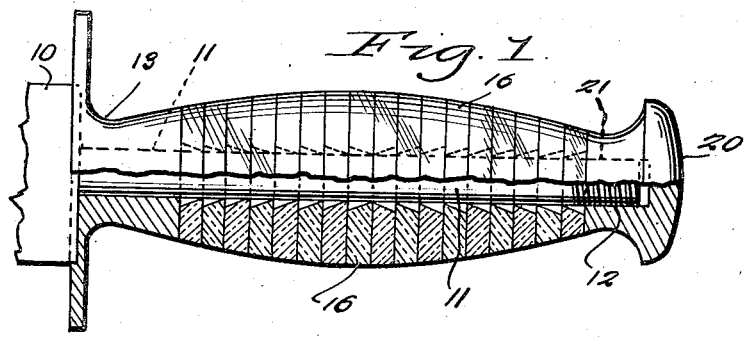
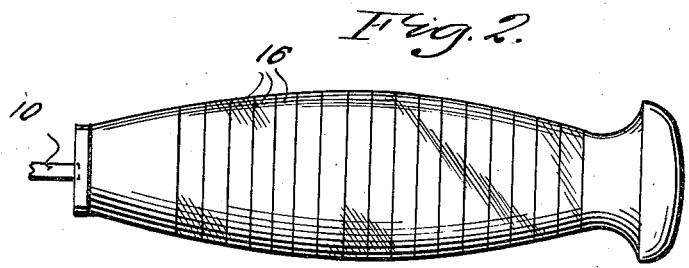
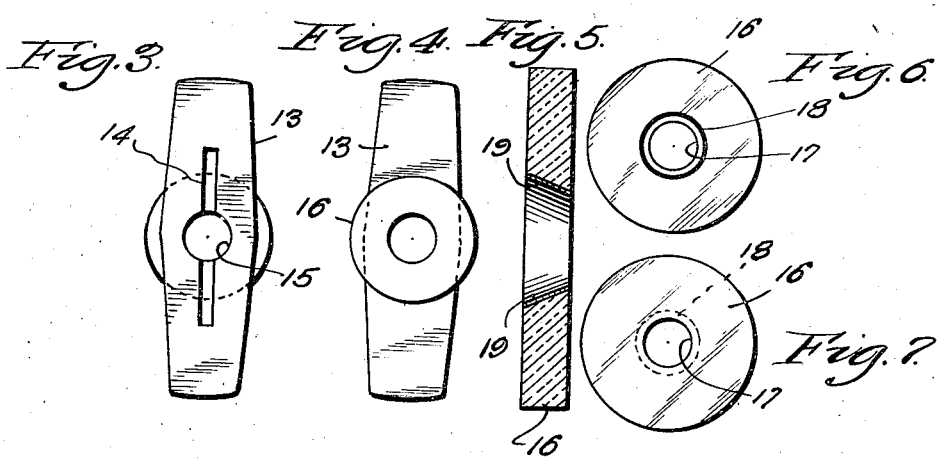
Don A. Dally, Inventor
By Clarence A. O'Brien
and Harvey B. Jacobson
Attorneys Patented July 8, 1947

2,423,640

UNITED STATES PATENT OFFICE 2,423,640

DECORATIVE KNIFE HANDLE

Don A. Dally, Pillager, Minn.

Application November 3, 1944, Serial No. 561,793

4 Claims. (Cl. 41—34)

This invention relates to a hilt for cutlery and more particularly to an improved handle for knives, forks and the like.

A primary object of this invention is the provision of an improved handle for cutlery which will be securely held to the blade and difficult to disassemble therefrom.

An additional object is the provision of such a handle which will serve to reinforce and strengthen the blade.

Still another object is the provision of such a handle which may be readily constructed from light, durable and inexpensive material.

A still further object is the provision of such a handle which will present an improved appearance.

A still further object is the provision of a handle which may be highly polished and hence lends itself readily to cleaning and polishing.

Still further objects reside in the combinations of elements, arrangements of parts, and features of construction, all as will be more fully pointed out as the description of the invention proceeds and shown in the accompanying drawings, wherein there is shown a preferred embodiment of this inventive concept.

In the drawings:

Figure 1 is a side view partially in section and partially in elevation of one form of hilt embodying the instant invention.

Figure 2 is a top plan view of the hilt shown in Figure 1.

Figure 3 is a bottom plan view of the hilt, the blade being removed.

Figure 4 is a top plan view of the hilt.

Figure 5 is an enlarged sectional view of one of the elements comprising the hilt.

Figure 6 is a plan view of one of the elements shown in section in Figure 5, and Figure 7 is a plan view of the element of Figure 6 as viewed from the opposite direction.

Like reference numerals refer to like parts throughout the several views of the drawings.

In the drawings there is shown at 10 a fragment of a knife blade to which is rigidly secured a shank 11 or the like threaded at its extremity as at 12. Fitted on shank 11 is a guard member 13 having a slit 14 cut partially therethrough within which the upper extremity of knife blade 10 is seated, and an aperture 15 through which the shank 11 is passed. A plurality of disk members 16 are positioned about the shank 11 above guard member 13. Disk members 16 are preferably of transparent material such as glass or the like and each is provided with a centrally disposed aperture 17 beveled as at 18, the shank 11 being passed through said apertures. The inner periphery of each of beveled apertures 17 is coated with a coloring material 19 (see Figure 5), and the disks are arranged as indicated in Figure 1 with the bevels below the center line of the hilt extending outwardly toward the blade and the bevels above the center of the hilt extending outwardly in the opposite directions. The coloring matter on the various bevels may be different to present any desired pattern or color scheme or combination.

Thus it will be seen that when the parts are assembled as above pointed out, the colors on the interior of the beveled apertures will be visible from the exterior of the handle.

After the disks 16 are placed in position on the shank a cap member 20 having a threaded aperture 21 therein is threadedly engaged with the threads 12 of shank 11, to compress the disks and secure the component parts of the handle in related assembly.

In initially manufacturing and assembling the device all the disks may be cut to the same size and circular in periphery, the handle thus formed may then be turned down to the required shape and polished.

When the device is completed it will thus be seen that there is provided a relatively strong handle which is also exceedingly ornamental in that the colors about the peripheries of the beveled apertures shine through the transparent or translucent material of the disks to provide a soft, diffused, merging color pattern as viewed from the exterior of the handle.

From the foregoing it will now be seen that there is herein provided a knife hilt achieving all the objects of this invention and others including many advantages of great practical utility and commercial importance.

As many embodiments may be made of this inventive concept, and as many modifications may be made in the embodiment hereinbefore described and shown in the accompanying drawings, it is to be understood that all matter herein is to be interpreted merely as illustrative and not in a limiting sense.

I claim:

1. In the combination of a knife having a blade, an integrally attached shank and a handle detachably secured to said shank; said handle comprising a plurality of transparent disks having centrally disposed beveled apertures therethrough positioned on said shank, coloring matter on the interior of said beveled apertures and means for retaining and compressing said disks.

2. In the combination of a knife having a blade, an integrally attached shank and a handle detachably secured to said shank; said handle comprising a plurality of transparent disks having centrally disposed beveled apertures therethrough positioned on said shank, coloring matter on the interior of said beveled apertures and means for retaining and compressing said disks, said means having a screw threaded portion for engagement with the end of said shank.

3. In the combination of a knife having a blade, an integrally attached shank and a handle detachably secured to said shank; said handle comprising a plurality of transparent disks having centrally disposed beveled apertures therethrough positioned on said shank, coloring matter on the interior of said beveled apertures and means for retaining and compressing said disks, the beveled portions of certain of said disks inclining in one direction and the beveled portions of others of said disks inclining in the opposite direction.

4. In the combination of a knife having a blade, an integrally attached shank and a handle detachably secured to said shank; said handle comprising a plurality of transparent disks having centrally disposed beveled apertures therethrough positioned on said shank, coloring matter on the interior of said beveled apertures and means for retaining and compressing said disks, the beveled portions of said disks being inclined oppositely from the transverse median of said handle.

DON A. DALLY.

REFERENCES CITED

The following references are of record in the file of this patent:

UNITED STATES PATENTS

| Number | Name | Date |
| --- | --- | --- |
| 22,795 | Gardner | Feb. 1, 1859 |
| 1,771,779 | Earnshaw | July 29, 1930 |
| 2,350,494 | Champlin et al. | June 6, 1944 |
| 1,915,112 | Wittstein | June 20, 1933 |
| 2,142,137 | Leary | Jan. 3, 1939 |